(12) United States Patent
Weber et al.

(10) Patent No.: US 8,540,303 B2
(45) Date of Patent: Sep. 24, 2013

(54) CABRIOLET TOP FOR A CABRIOLET, AND CABRIOLET WITH A CABRIOLET TOP

(75) Inventors: Hanno Weber, Weil der Stadt (DE); Mathias Froschle, Ostfildern (DE)

(73) Assignee: Dr. Ing. H.C. F. Porsche Aktiengesellschaft (DE)

( * ) Notice: Subject to any disclaimer, the term of this patent is extended or adjusted under 35 U.S.C. 154(b) by 433 days.

(21) Appl. No.: 12/707,495

(22) Filed: Feb. 17, 2010

(65) Prior Publication Data

US 2010/0237651 A1    Sep. 23, 2010

Related U.S. Application Data

(60) Provisional application No. 61/173,767, filed on Apr. 29, 2009.

(30) Foreign Application Priority Data

Mar. 18, 2009  (DE) .......................... 10 2009 014 968

(51) Int. Cl.
 *B60J 7/08*  (2006.01)
(52) U.S. Cl.
 USPC ............ 296/107.08; 296/107.16; 296/107.17; 296/136.06
(58) Field of Classification Search
 USPC .................. 296/108, 107.07, 107.08, 107.16, 296/107.17, 107.2, 136.06
 See application file for complete search history.

(56) References Cited

U.S. PATENT DOCUMENTS

| | | | |
|---|---|---|---|
| 6,443,517 B1* | 9/2002 | Just et al. ................. | 296/107.09 |
| 7,014,245 B2 | 3/2006 | Yoshida | |
| 7,100,963 B2* | 9/2006 | Queveau et al. ............. | 296/108 |
| 7,832,784 B2 | 11/2010 | Cimatti | |
| 7,959,210 B2* | 6/2011 | Mangold et al. ......... | 296/136.06 |
| 8,167,355 B2* | 5/2012 | Guetet ........................... | 296/108 |
| 2005/0088008 A1* | 4/2005 | Quindt et al. ............ | 296/107.08 |
| 2005/0184554 A1* | 8/2005 | Queveau et al. ............. | 296/108 |
| 2007/0187984 A1 | 8/2007 | Brockhoff | |
| 2008/0061590 A1* | 3/2008 | Schulz et al. ................. | 296/108 |
| 2008/0093880 A1* | 4/2008 | Westermann et al. ... | 296/107.17 |
| 2008/0258492 A1 | 10/2008 | Brockhoff | |
| 2009/0261625 A1* | 10/2009 | Guetet ........................... | 296/224 |
| 2010/0019531 A1* | 1/2010 | Noda et al. ............... | 296/107.07 |

FOREIGN PATENT DOCUMENTS

| | | |
|---|---|---|
| DE | 10 2006 011 686 | 9/2007 |
| EP | 1834822 A2 | 9/2007 |
| EP | 1 758 749 | 1/2009 |
| JP | 2007261297 | 10/2007 |

* cited by examiner

*Primary Examiner* — Jason S Morrow
(74) *Attorney, Agent, or Firm* — Gerald E. Hespos; Michael J. Porco; Matthew T. Hespos

(57) ABSTRACT

A cabriolet top (8) for a cabriolet (1) has a roof (10) which, in a closed position (ST) of the cabriolet top, upwardly bounds a vehicle interior (9) and, for an open position of the cabriolet (1), is movable into a storage position (AS) in a storage space (21). The roof (10) has a main roof part (11) and closing roof parts (12, 13) which, in the closed position (ST), form a continuous roof surface. The main roof part (11) has at least one open-edged cutout (24, 25) that is closed by the closing roof part (12, 13) in the closed position (ST). However, the closing roof part (12, 13) is displaced relative to the main roof part (11) and opens the cutout (24, 25) in the storage position (AS).

40 Claims, 11 Drawing Sheets

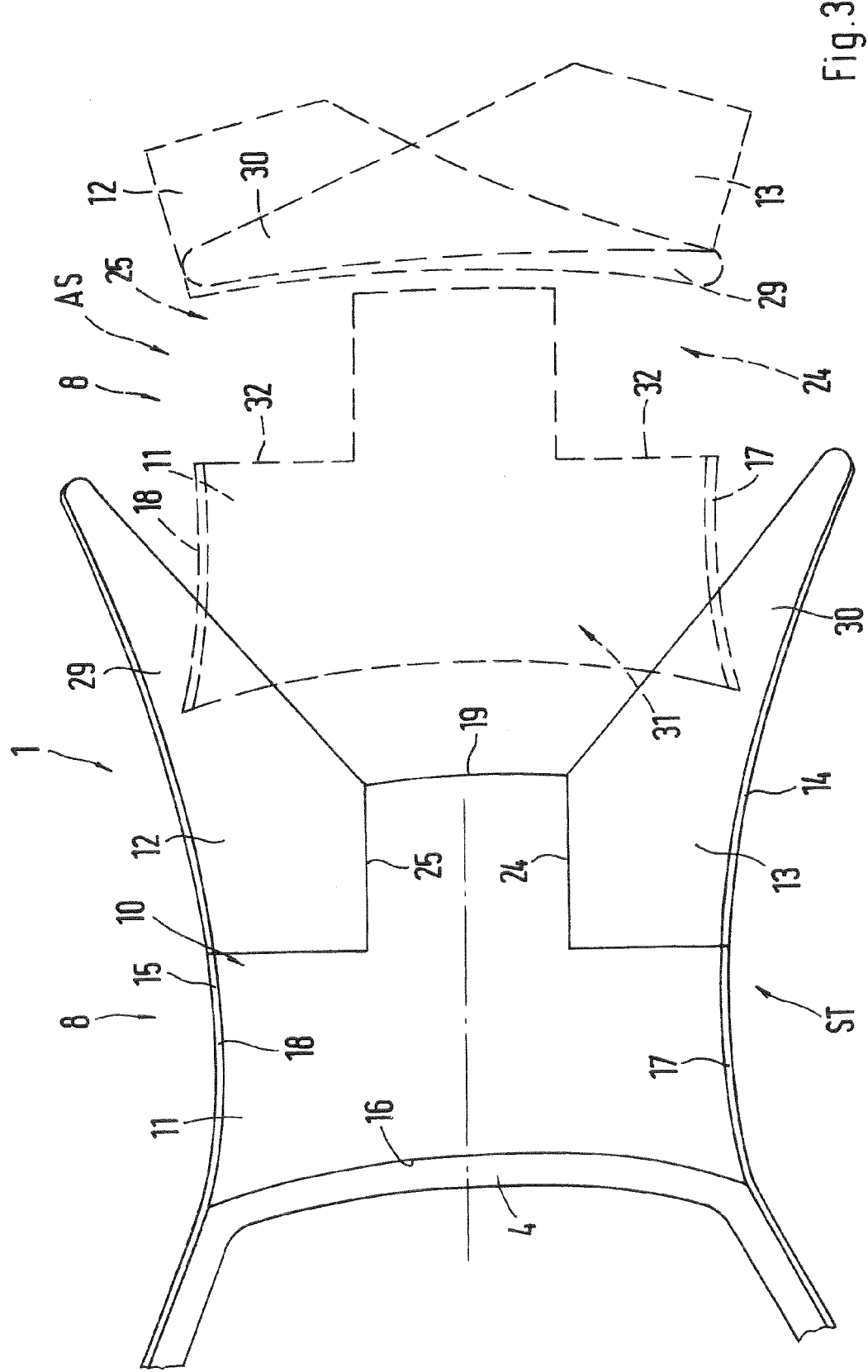

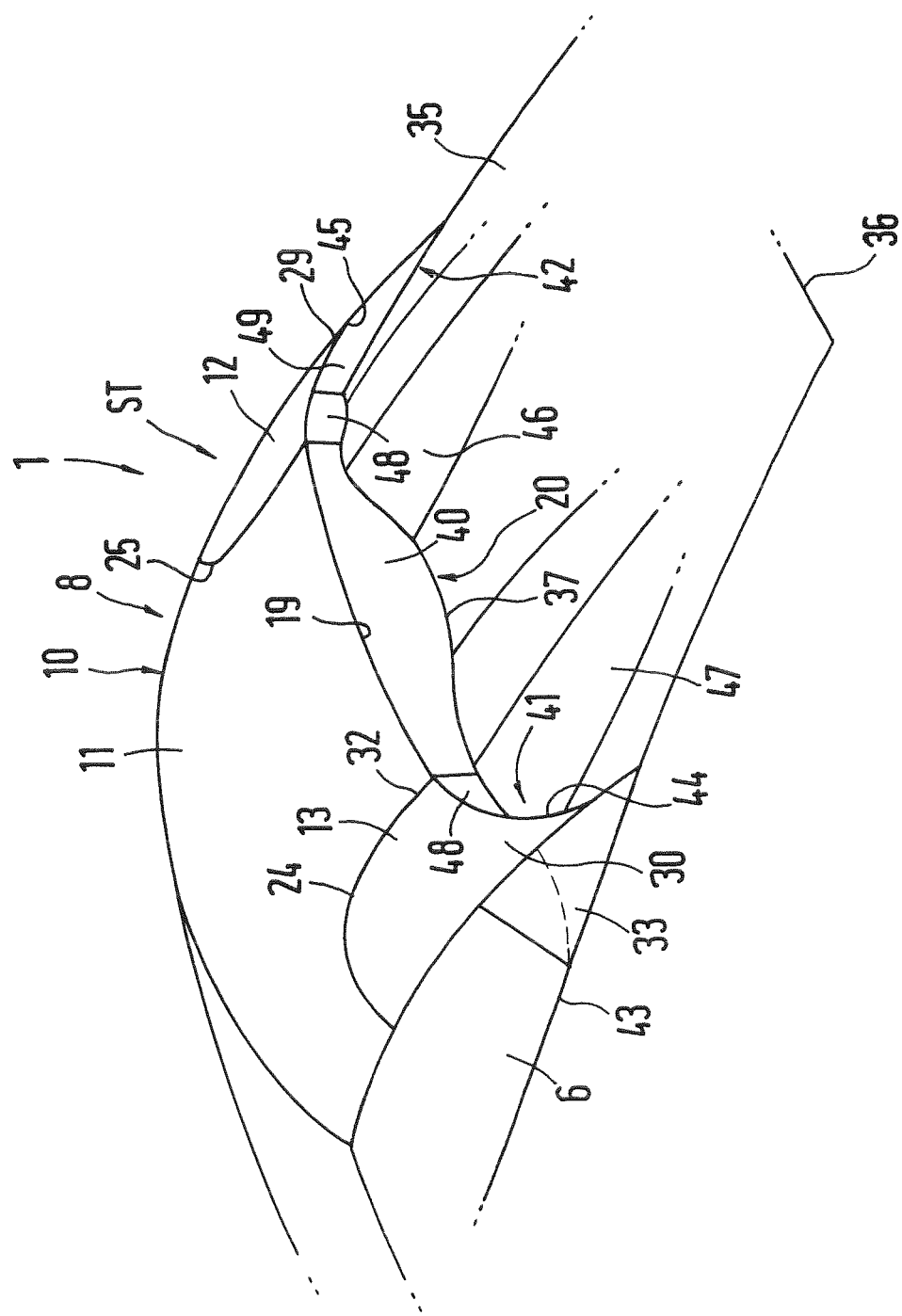

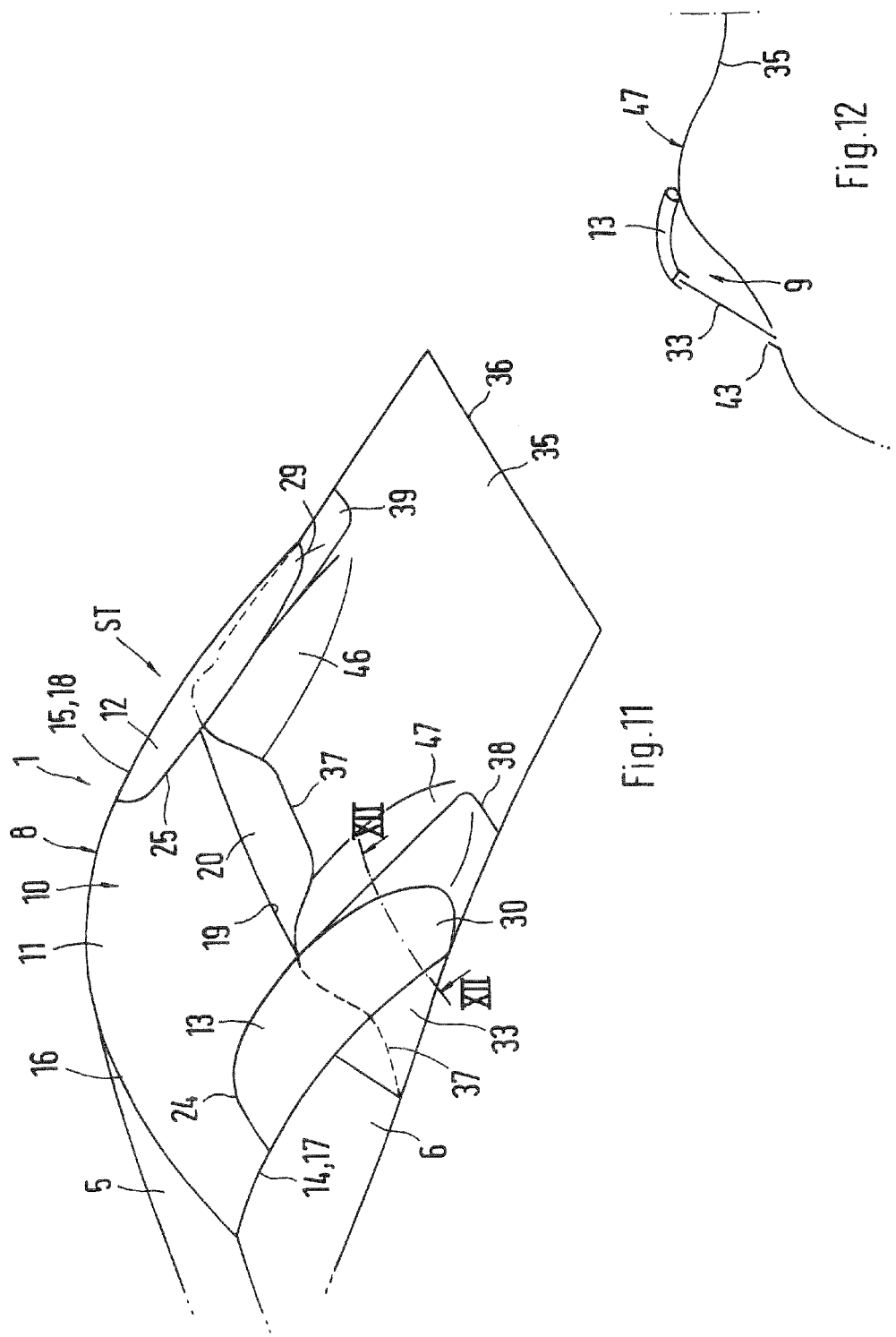

CABRIOLET TOP FOR A CABRIOLET, AND CABRIOLET WITH A CABRIOLET TOP

CROSS-REFERENCE TO RELATED APPLICATIONS

This application claims priority under 35 USC 119 to German Patent Application No. 10 2009 014 968.6 filed on Mar. 18, 2009 and U.S. Provisional Patent Appl. No. 61/173,767 filed on Apr. 29, 2009, the entire disclosure of which is incorporated herein by reference.

BACKGROUND OF THE INVENTION

1. Field of the Invention

The invention relates to a cabriolet top for a cabriolet and to a cabriolet with such a cabriolet top.

2. Description of the Related Art

EP 1 758 749 B1 discloses a cabriolet top that can be moved between an open position and a closed position. The open cabriolet top is movable into a storage position in a storage space at the rear. The closed cabriolet top forms a roof that is approximately rectangular in plan view and upwardly bounds a vehicle interior. The roof is formed by movable roof parts, which, in the closed position, form a continuous roof surface. The known cabriolet top has a front roof part and a rear roof part. The front roof part is formed integrally with lateral roof frames. The rear roof part comprises a central section having a rear window, and lateral C pillars as movable roof parts. The C pillars are laid down over the rear window during the movement between the closed position and the storage position. As a result the storage space does not have to be increased downwards.

An object of the invention is to provide a cabriolet top that can be stored in a storage space with optimized use of the space.

SUMMARY OF THE INVENTION

The invention relates to a cabriolet top for a cabriolet and to a cabriolet with such a cabriolet top.

The cabriolet top of the invention can be put away even in a cabriolet storage space is cut up unfavorably by, for example, other parts of the vehicle body, parts of other subassemblies, or components in general that project into the storage space. The cabriolet top of the invention preferably has at least one open-edged cutout so that the main roof part is recessed at a point that is occupied in the storage space by another vehicle part. The cutout in the main roof part is opened up when in the storage position so that the at least one closing roof part is displaced out. Therefore, the cabriolet top of the invention enables the storage space in a vehicle to be used particularly well. In addition, the cabriolet top has a small packing height in the storage position. Thus, a cabriolet with little overall space for a storage space can be equipped with the cabriolet top of the invention. In general, therefore, obstacles on the vehicle can protrude into the storage space or can be fit there without adversely affecting the ability to put away the cabriolet top of the invention. In the storage position, the main roof part is recessed by the cutout precisely at the point that already is occupied by the obstacle in the storage space.

The main roof part of the invention with the at least one cutout is integrated into the roof so that, in the closed position, the main roof part is arranged between a rear part and a windscreen frame of the cabriolet. At least one further roof part also may be arranged between the main roof part and the rear part. The rear part can be assigned to the cabriolet top or to the body of the cabriolet.

The cutout of the invention can have an angular shape, as seen in top view, or alternatively the boundary edge of the cutout can have a rectilinear or curved profile, depending on requirements. In other words the shape of the cutout, as seen in top view, can be, for example, a circular section, a triangle, a quadrangle or a polygon. Of course, combinations thereof are also conceivable. In a preferred embodiment, the closing roof part has a shape that fits precisely into the cutout so that, in the closed position of the cabriolet top, the approximately rectangular shape of the main roof part is formed by the closing roof part.

The closing roof part can have a greater extent or area than the cutout. Therefore, the closing roof part could extend by means of an extension over the rectangular shape or the border of the main roof part into a different region, in particular roof region. The closing roof part could extend, for example in the direction of the vehicle rear, by means of such an extension and, for example, could laterally surround an optional rear window.

The closing roof part preferably is displaced under, over, behind or next to the main roof part in the storage position and will take up the storage position together with the main roof part.

The cutout preferably is a corner cutout on the main roof part. This is particularly advantageous if, for example, a "spring strut dome" or wheel guard of the vehicle body projects into the storage space and is a lateral obstacle on the outside and more in the rear region of the storage space. In the storage position, the main roof part therefore is recessed by the cutout precisely at the point that already is occupied in the storage space by the spring strut dome or the wheel guard.

The closing roof part preferably can be raised, lowered, pivoted and/or displaced relative to the main roof part so that the closing roof part can be moved during the movement of the cabriolet top between the closed position and the storage position.

The closing roof part preferably is controlled forcibly in relation to the main roof part, so that the closing roof part is adjusted forcibly relative to the main roof part during the putting-away movement thereof. Alternatively, a separate drive can also be provided for the closing roof part. The drive preferably is synchronized with the putting-away movement of the main roof part. Thus, the closing roof part may be coupled movably to the main roof part. The closing roof part may be mounted on another roof part of the cabriolet top or may be mounted directly on the cabriolet.

The roof parts may be rigid panels so that the cabriolet top is a "retractable hard top".

The main roof part may have plural open-edged cutouts, each of which is closed by at least one closing roof part in the closed position of the cabriolet top. Thus, the stored main roof part may be recessed at plural points and may be put away in the storage space without touching plural obstacles protruding into the storage space. The plural cutouts may overlap on one or more sides, i.e. in corner regions of the main roof part. The cutout or the cutouts could be formed on the rear or front side or on at least one longitudinal side of the main roof part as seen in the longitudinal direction of the vehicle. The cutout or the cutouts preferably are provided in a border strip of the main roof part.

The cutouts preferably are in a rear border strip of the main roof part. However, the cutouts could be on opposite sides of the main roof part, such as on the longitudinal sides of the main roof part.

Any of the cutouts that are in the border strip on the longitudinal sides or in the corner region preferably are wider than a lateral roof frame of the main roof part as measured in the transverse direction of the vehicle. The cutouts therefore also extend into a surface region of the main roof part that is between the lateral roof frames.

The cutouts could be formed at positions on the main roof part spaced from a lateral roof frame. For example, an approximately central cutout could be formed on the rear in the border strip of the main roof part, such as in the surface region between the roof frames. The cutout therefore also could be narrower than the surface region of the main roof part between the roof frames.

The invention also relates to a cabriolet with a storage space and the above-described cabriolet top.

The cabriolet may have a rear part that comprises or consists of a rear window. The rear part may be part of the cabriolet top or may be part of the cabriolet. More particularly, movement of the rear part may be coupled to movement to the cabriolet top or may be independent of the movement of the cabriolet top.

The rear part can have plural elements that are connected moveably to other parts of the cabriolet top or that are connected moveably to the cabriolet or the body thereof. A rear part with plural elements can have a rear window as one element and can have other elements that are opaque. Alternatively, the rear window of the rear part can be made of plural elements.

At least a section of the rear part, such as the rear window, may be connected laterally on the outside directly to side windows of the cabriolet. In such an embodiment, the rear part or the rear window may comprise plural elements.

The cabriolet may have rear side windows behind front side windows. The front side windows may be associated with vehicle doors and the rear side windows may be fixed side parts of the cabriolet. In this case, the rear part or the rear window may not be connected directly to the front side windows, but rather to the rear side windows.

The cabriolet may have a cabriolet top with a closing roof part that has a larger area than the associated cutout in the main roof part and the rear window may be under the closing roof part when the cabriolet top is in the closed position. A rear part, such as a rear window, can be between the closing roof parts. Thus, the closed cabriolet top may have a continuous roof surface comprising a main roof part, closing roof parts and rear window, as is customarily known for "retractable hard tops". In addition, the rear part of this embodiment can be of multipart design.

The rear part may be approximately upright under the extensions of the closing roof parts and the main roof part when the cabriolet top is in the closed position. The rear part therefore follows the border edge profile of the main roof part and of the closing roof parts to achieve the appearance of a fin.

The cabriolet may have a lid that is of movable design so that the storage space in the cabriolet for the cabriolet top can be closed and opened. The lid is closed in the closed position of the cabriolet top. The lid then is opened before the cabriolet top is to be put away, and the cabriolet top subsequently is lowered into the storage space and the lid is closed again. A lid front edge of the lid may be connected to the rear part to define a seal between the rear part and lid when the cabriolet top is in the closed position. Thus, the lid can be opened and closed by pivoting about a rear border edge for the putting away of the cabriolet top. For this purpose, the closing roof parts advantageously could be raised before the lid is moved if the closing roof parts are designed with rearwardly directed extensions.

The lid also could also have decouplable covers located under the closing roof parts that have the extensions when the cabriolet top is in the closed position. The covers could be decoupled from the lid so that the lid can be opened pivotably. The decouplable covers later can be moved away so that the storage space is completely accessible from above, thereby enabling the cabriolet top to be put away in the storage space.

The lid may have at least one elevation located adjacent to a lid front edge. The elevation can be located centrally on the rear cover or can be on the outside of the lid so that two elevations are provided. The elevations preferably have a dome shape, and can be used in the case of cabriolets that are constructed as "speedsters".

The extensions of the closing roof parts may engage over the elevation or elevations when the cabriolet top is in the closed position. Alternatively, the elevation and the closing roof part can be connected flush to each other, particularly if the closing roof parts do not have any extensions.

The invention is explained in more detail below using exemplary embodiments and other advantageous refinements and with reference to the drawings. Features assigned in each case to one exemplary embodiment can be combined with other exemplary embodiments.

BRIEF DESCRIPTION OF THE DRAWINGS

FIGS. 1 to 3 each show, in a top view, in a closed position and a storage position, an exemplary embodiment of a cabriolet top with cutouts in the main roof part and with closing roof parts.

FIGS. 6 to 11 each show a further exemplary embodiment of a cabriolet top.

FIG. 12 shows a section through the cabriolet top according to FIG. 11.

DETAILED DESCRIPTION OF THE PREFERRED EMBODIMENTS

Figure 1:
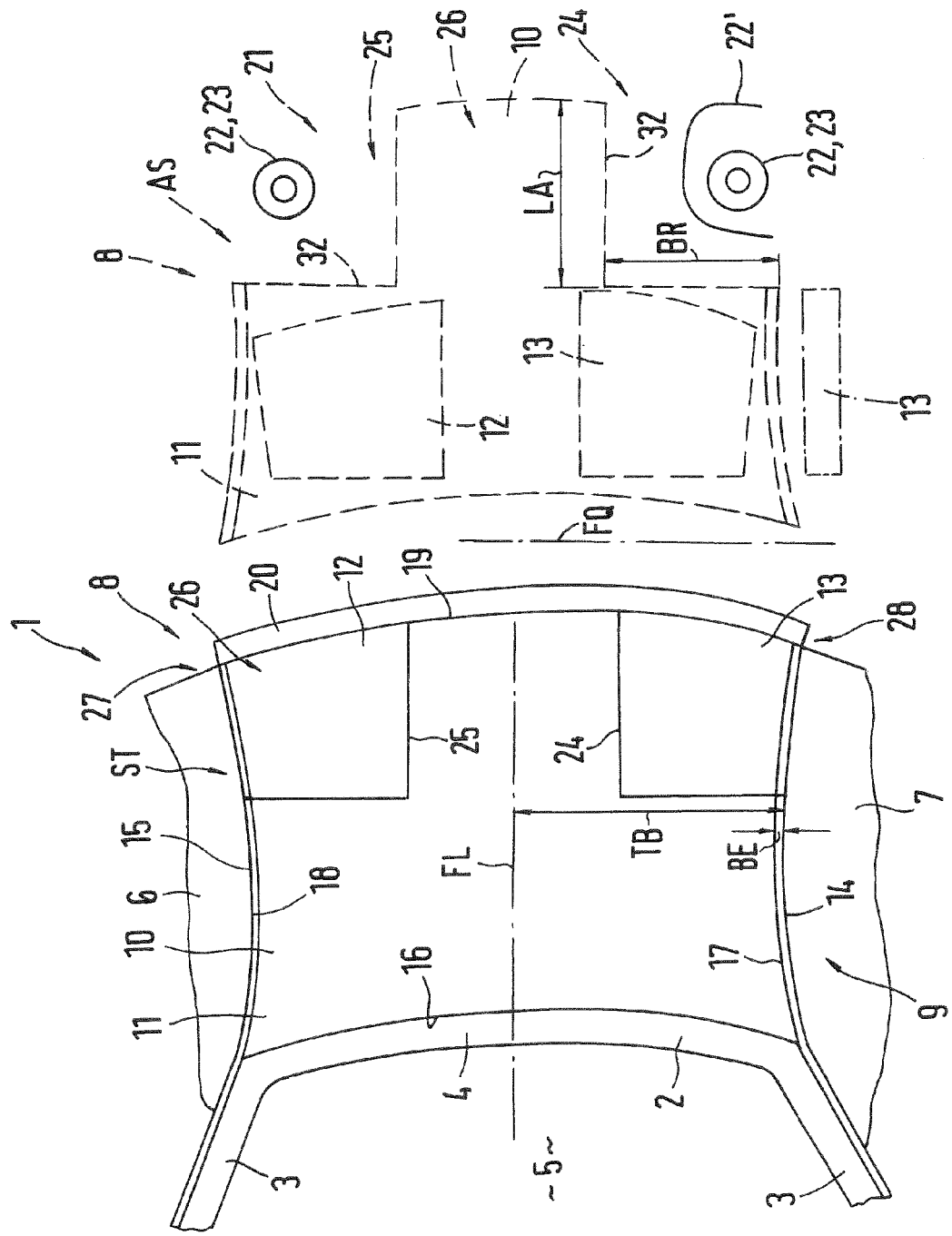

A cabriolet in accordance with the invention is identified generally by the numeral 1 in FIG. 1. The cabriolet 1 has a windscreen frame 2. The windscreen frame 2 has two spaced apart frame limbs 3 and a transverse frame limb 4 or upper cowl that connects the two frame limbs 3. The frame limbs 3 are elongations of the A pillars (not shown). The windscreen frame 2 surrounds a windscreen 5. The cabriolet 1 also includes side windows 6 and 7 that are held on doors (not illustrated here). The cabriolet 1 further includes a cabriolet top 8, which is shown in solid lines in a closed position ST where the cabriolet top 8 upwardly bounds and closes a passenger compartment 9 located therebelow. In the closed position ST, the cabriolet top 8 forms a roof 10 with a roof tip that bears against and is locked to the transverse frame limb 4, as is customary for cabriolet tops. The roof 10 is formed by roof parts 11, 12, 13 that are adjacent to one another in the closed position ST and therefore form the continuous roof 10. The roof 10 also has lateral roof frames 14 and 15 that run parallel to the longitudinal axis FL of the vehicle. As seen in top view, the roof 10 has an approximately rectangular or quadrangular shape defined by a front end 16, left and right longitudinal sides 17 and 18 and a rear end 19. The front end 16 bears against the transverse frame limb 4 in the closed position ST. The longitudinal sides 17 and 18 are formed by the lateral roof frames 14 and 15. The rear end 19 is adjacent to a rear part 20 of the cabriolet top 8 in the closed position ST. Border strips run parallel to each side, but are not shown separately. The rear part 20 is identified as part of the cabriolet top, but could also be part the vehicle body (only part of which is shown here). With either of these options, the rear part 20 may be of fixed rigid design or may be movable and able to be put away. The rear part 20 can be moved in a linked manner with the cabriolet top 8 if the rear part 20 is part of the cabriolet top 8. However, the rear part 20 is held movably on the body if the rear part is part of the body.

Although the roof 10 has an approximately rectangular shape in top view, one or more sides 16, 17, 18, 19 may deviate from a straight line. For example, the roof frames 14 and 15 may be curved to match the side windows 6 and 7. Similarly, the front end 16 may have a curved profile to match the shape of the transverse frame limb 4 and the rear end 19 may have a curved shape to match the rear part 20. The roof 10 also could have a trapezoidal shape in the top view.

The cabriolet 1 has a storage space 21 shown in dashed lines in FIG. 1 for receiving the cabriolet top 8 in a storage position AS. The vehicle interior 9 is opened up when the roof 10 is in the storage position AS and hence the cabriolet is in the open position. The cabriolet top 8 may be moveable between the closed position ST and the storage position AS by a linkage (not shown here) that is connected movably to the roof 10 and the body of the cabriolet 1. A drive also can be provided to move the roof 10 with the linkage between the two positions AS and ST. Consequently, the cabriolet top 8 can be moved manually, fully automatically or semi-automatically between the closed position ST and the storage position AS.

The storage space 21 is in the rear of the cabriolet 1 and at least one obstacle 22 protrudes into the storage space 21. The obstacle 22 belongs, for example, to the body of the cabriolet 1 or is formed by other components or subassemblies of the cabriolet 1. The obstacle 22 preferably is fixed, but also could be movable. In each case, the obstacle 22 restricts the space available for the storage position AS in the storage space 21. The embodiment shown in FIG. 1 has two laterally spaced obstacles 22 formed, for example, by spring strut domes 23, which are arranged symmetrically with respect to the longitudinal axis FL of the vehicle. A wheel guard 22' also could constitute an obstacle 22. In each case, the obstacle 22 protrudes sufficiently into the storage space 21 to prevent a deep storage of the roof 10 in the storage space 21. However, the main roof part 11 of the roof 10 has at least one recess or cutout 24 that enables the roof 10 to be put away deep down adjacent to a floor (not shown) of the storage space 21. The main roof part 11 is significantly larger than the other roof parts 12, 13. The cutout 24 is open-edged and opens to at least one of the edges 16, 17, 18, 19. Therefore, the main roof part 11 of the roof 10 deviates from the above-described quadrangular or rectangular shape. In the closed position ST, the cutout 24 is closed by the roof part 13, which is referred to herein as the closing roof part 13. The closing roof part 13 displaces out of the cutout 24 for the storage position AS so that the cutout 24 defines a recess in the main roof part 11 for receiving the obstacle 22. The cutout 24 has a width BR measured in the direction of the transverse axis FQ of the vehicle and a length LA measured in the direction of the longitudinal axis FL of the vehicle that are some larger than the corresponding dimensions of the obstacle 22. Consequently, a boundary edge 32 of the cutout 24 is spaced from the obstacle 22. In addition, the width BR of the cutout 24 is larger than the width BE of the roof frame 14 as measured in the same direction. Furthermore, the width BR of the cutout 24 is smaller than the partial width TB of the roof 10 between the longitudinal axis FL of the vehicle and the roof frame 14. The above-defined border strips on the sides 16 to 19 are wider than the roof frame 14, 15 and preferably are approximately of a width that corresponds to the width BR. Consequently, the cutout 24 is located within a border strip that runs between two opposite sides 16, 17, 18, 19.

The main roof part 11 and the closing roof part 13 form a continuous roof surface in the closed position ST. However, the closing roof part 13 can be displaced relative to the main roof part 11 to open up the cutout 24 for the storage position AS. The closing roof part 13 can slide and/or pivot relative to the main roof part 11 to raise or lower the closing roof part 13 so that the closing roof part 13 lies above or below the main roof part 11 in the storage position AS. The closing roof parts 12 and 13 also can be rotated about the longitudinal axis FL of the vehicle and therefore stored upright as shown, for example, by the chain-dotted line depiction of the closing roof part 13 in FIG. 1. Accordingly, the closing roof parts 13 can stand approximately upright laterally next to the main roof part 11. However, the upright closing roof parts 12 and 13 also could be provided in the region of the respective recess 24, 25. In this case, the upright closing roof parts 12 and 13 are oriented in the direction of the longitudinal axis FL of the vehicle.

A second cutout 25 can be provided on the main roof part 11 in a mirror-inverted manner with respect to the longitudinal axis FL of the vehicle. A second closing roof part 12 closes the second cutout 25 in the closed position ST. However, the second closing roof part 12 opens up the second cutout 25 in the storage position AS. The statements made above regarding the cutout 24 and the closing roof part 13 apply analogously to the second closing roof part 12 and the second cutout 25. The two cutouts 24 and 25 are formed in a strip-shaped rear section 26 on the rear side 19 of the main roof part 11. In particular, the open-edged cutouts 24 and 25 are formed in a corner region 27 or 28 of the main roof part 11. As used herein, open-edged means that the cutout 24 or 25 is designed to be opened to at least one side 16, 17, 18, 19. In the embodiment of FIG. 1, the cutouts 24 and 25 are of open-edged design to the sides 17 and 18 and to the rear end 19. In the closed position ST, the three roof parts 11, 12 and 13 therefore form a continuous roof surface with an approximately rectangular shape in the closed position ST. In a preferred embodiment, the roof parts 11, 12 and 13 are rigid panels.

Figure 2:
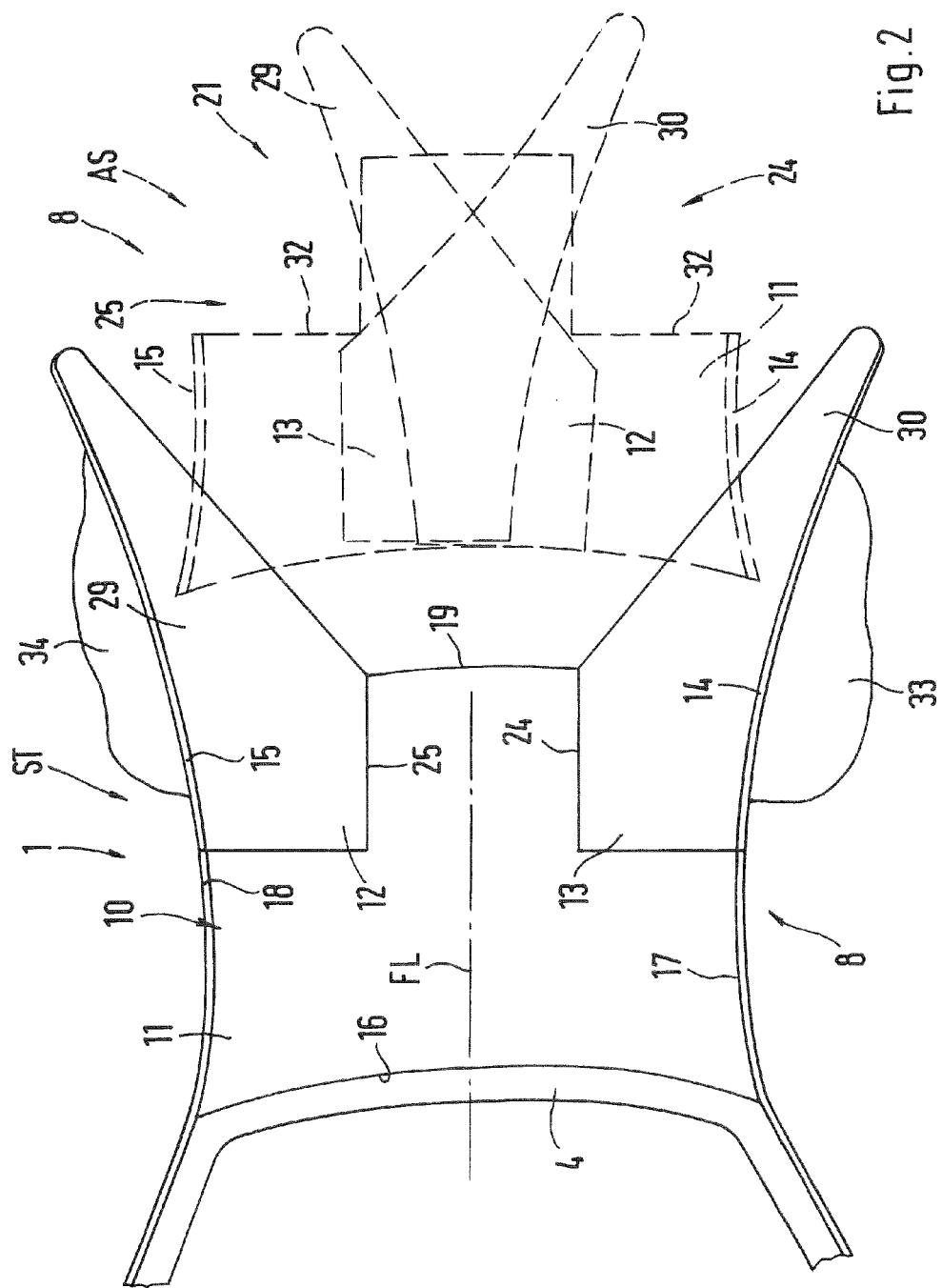

A second embodiment of a roof 10 is illustrated in FIG. 2. Parts of the second embodiment that are identical to parts of the first embodiment or act in an identical manner have the same reference numbers, but are not described again. The two closing roof parts 12 and 13 of the second embodiment have a larger surface area than the cutouts 24 or 25. The closing roof parts 12 and 13 end flush with the longitudinal sides 17, 18 of the main roof part 11. However, the closing roof parts 12 and 13 have extensions 29 and 30 that extend rearward and laterally beyond the main roof part 11. A rear window (not illustrated here) could be arranged between the extensions 29, 30 and would be storable, if appropriate, independently of the closing roof parts 12, 13. Alternatively a rear part 20 could stand approximately upright under the rear edge 19, as described in conjunction with FIG. 1, in which case the extensions 29, 39 would stand freely at a lateral distance from each other when the roof 10 is in the closed position. The extensions 29 and 30 of the closing roof parts 12 and 13 shown in FIG. 2 also could merely satisfy visual requirements.

The closing roof parts 12 and 13 are moved relative to the main roof part 11 and are displaced from the cutouts 24 and 25 in the storage position AS, illustrated by dashed lines in FIG.

2. The closing roof parts 12 and 13 are put away on or under the main roof part 11 in the storage position AS so that the extensions 29 and 30 substantially open the respective cutouts 24 and 25 in the direction of their longitudinal extent, i.e. parallel to the longitudinal axis FL of the vehicle. Additionally, the two closing roof parts 12 and 13 at least partly overlap each other in the storage position AS. However, one closing roof part 12 could be put away under the main roof part 11 and the other closing roof part 13 could be put away over the main roof part 11. Rear side windows 33 and 34 could be connected to the border strips of the closing roof parts and could adjoin rear ends the side windows 6 and 7 of FIG. 1. The rear side windows 33 and 34 can be fixed or lowerable, and in a preferred embodiment are assigned to a side wall (not illustrated) of the vehicle body. The side windows 6 and 7 also may be capable of being raised or lowered. However, the rear side windows 33 and 34 could be assigned to the cabriolet top 8 rather than to the vehicle body. In this case, the rear side windows 33 and 34 can be movable relative to the roof parts 11, 12, 13 of the cabriolet top 8. However, the rear side windows 33 and 34 also can be fixed to one of the roof parts 11, 12, 13. When connected to the cabriolet top, the rear side windows 33 and 34 can be put away in the storage space 21 when the cabriolet top 8 is the storage position AS.

A third embodiment of the cabriolet top 8 is shown in FIG. 3. The third embodiment differs from the embodiment of FIG. 2 is that the closing roof parts 12 and 13 are put away in the direction of their longitudinal extent transversely with respect to the longitudinal axis FL of the vehicle when the cabriolet top 8 is in the storage position AS, shown by dashed lines. The storage can take place on a front section 31 of the main roof part 11 or, as illustrated in FIG. 3, behind the closing roof part 11. The two closing roof parts 12 and 13 can be located behind the main roof part 11 in the storage space 21 in a position where they overlap one above the other. In every case, the closing roof parts 12 and 13 are stored so that the cutouts 24 and 25 are opened.

Figure 5:
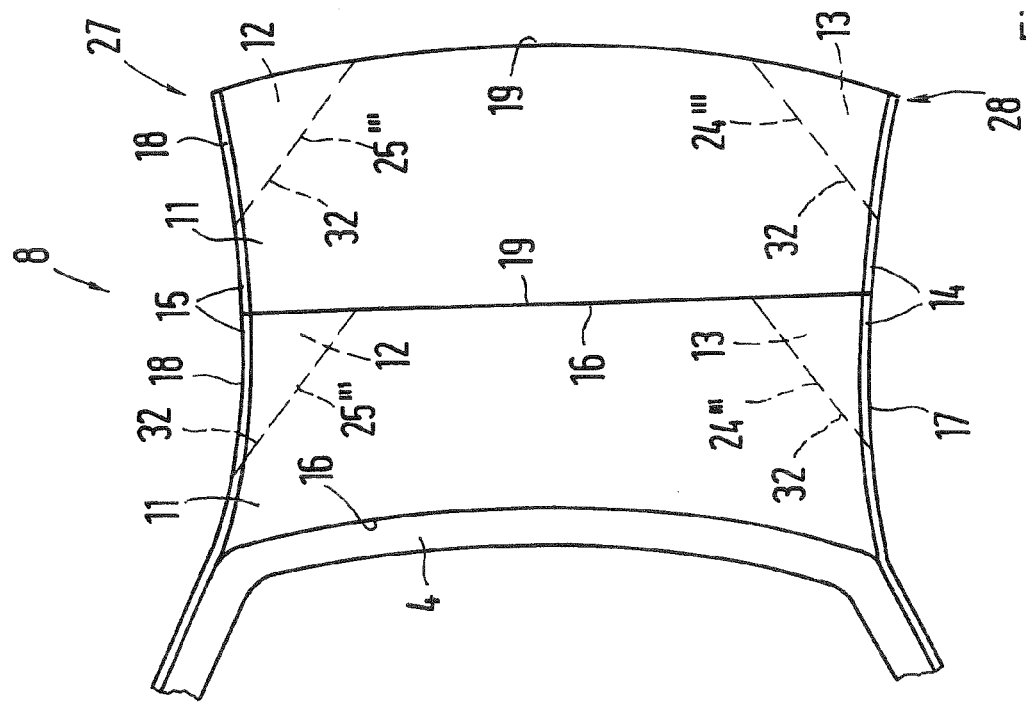
FIGS. 4 and 5 show various other embodiments of cutouts and closing roof parts of cabriolet tops according to the invention.
Figure 4:
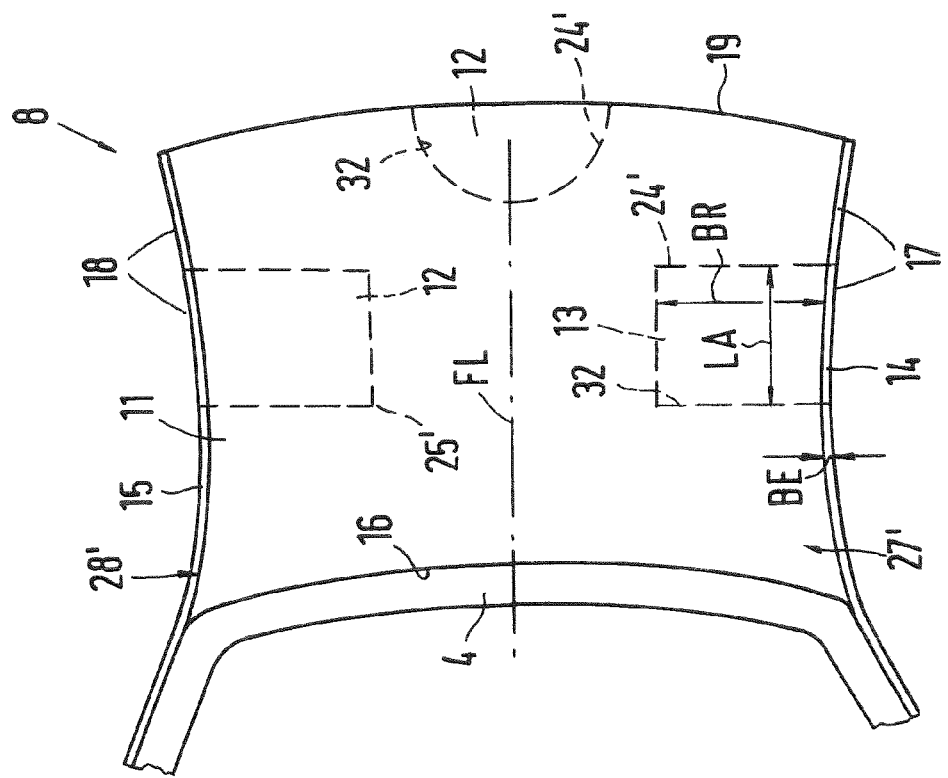

Further embodiments for the arrangement of the cutouts and closing roof parts are illustrated in FIGS. 4 and 5. The various cutouts are shown here on the main roof part 11 by dashed lines. Otherwise, parts that are identical or act in an identical manner have the same reference numbers as in FIGS. 1 to 3. In FIG. 4, two cutouts 24' and 25' are provided in the main roof part 11 and are open-edged only to one side 17 or 18 of the main roof part 11. The width BR of the cutouts 24', 25' is greater than the width BE of the roof frame 14 or 15. The length LA of cutouts 24', 25' is shorter than the overall length of the roof 10. The boundary edges 32 of the cutouts 24', 25' have an angular profile.

A cutout 24" opens only at the rear end 19 and has a curved boundary edge 32 shown by dashed lines in FIG. 4. The cutout 24" has a width BR measured on the rear end 19 that is larger than the width BE of the roof frame 14. Additionally, the cutout 24" is spaced from the roof frame 14 or 15. The cutout 24" is arranged symmetrically with respect to the longitudinal axis FL of the vehicle. At least one such cutout 24" could be formed on at least one other side 16, 17, 18.

The embodiment of FIG. 5 has cutouts 24''' or 25''' with a rectilinear profile of the boundary edge 32. The cutouts 24''' and 25''' and therefore the closing roof parts 12, 13 inserted therein are approximately triangular in top view. Furthermore, the main roof part 11 of the embodiment in FIG. 5 is of two-part design so that two main roof parts 11 are one behind the other in the closed position ST and form the roof 10. Each of the main roof parts 11 has at least one of the cutouts 24''' or 25'''. In this case, the positions of the cutouts are selected so that, in the storage position, the cutouts of the two main roof parts 11 lay one above the other to define a recess for the obstacle 22.

It is clear that different shapes of cutouts and the closing roof parts 12 and 13 correspondingly adapted to the shapes can be used in a single main roof part 11, if appropriate and also in combination with one another. For example, a cutout and a corresponding closing roof part can be provided on a corner region 27 and, in top view, the boundary edges 32 thereof can have a different shape or different profile than that provided for the other corner region 28 (FIG. 1). It also is conceivable to arrange at least one cutout in a front corner region 27' or 28' of the main roof part 11. Of course, more than two cutouts can also be provided on a main roof part 11. For example, three, four or more cutouts could be made in the main roof part 11. At least an identical number of closing roof parts is provided corresponding to the number of cutouts. As an alternative, at least two closing roof parts could be provided for one cutout.

FIGS. 6 to 11 and 13 are described below and show part of the cabriolet 1 in a perspective in which the viewing direction starts from the vehicle rear from the left and top. Parts that are identical or act in an identical manner with FIGS. 1 to 5 have the same reference numbers, and are not described again.

Figure 6:
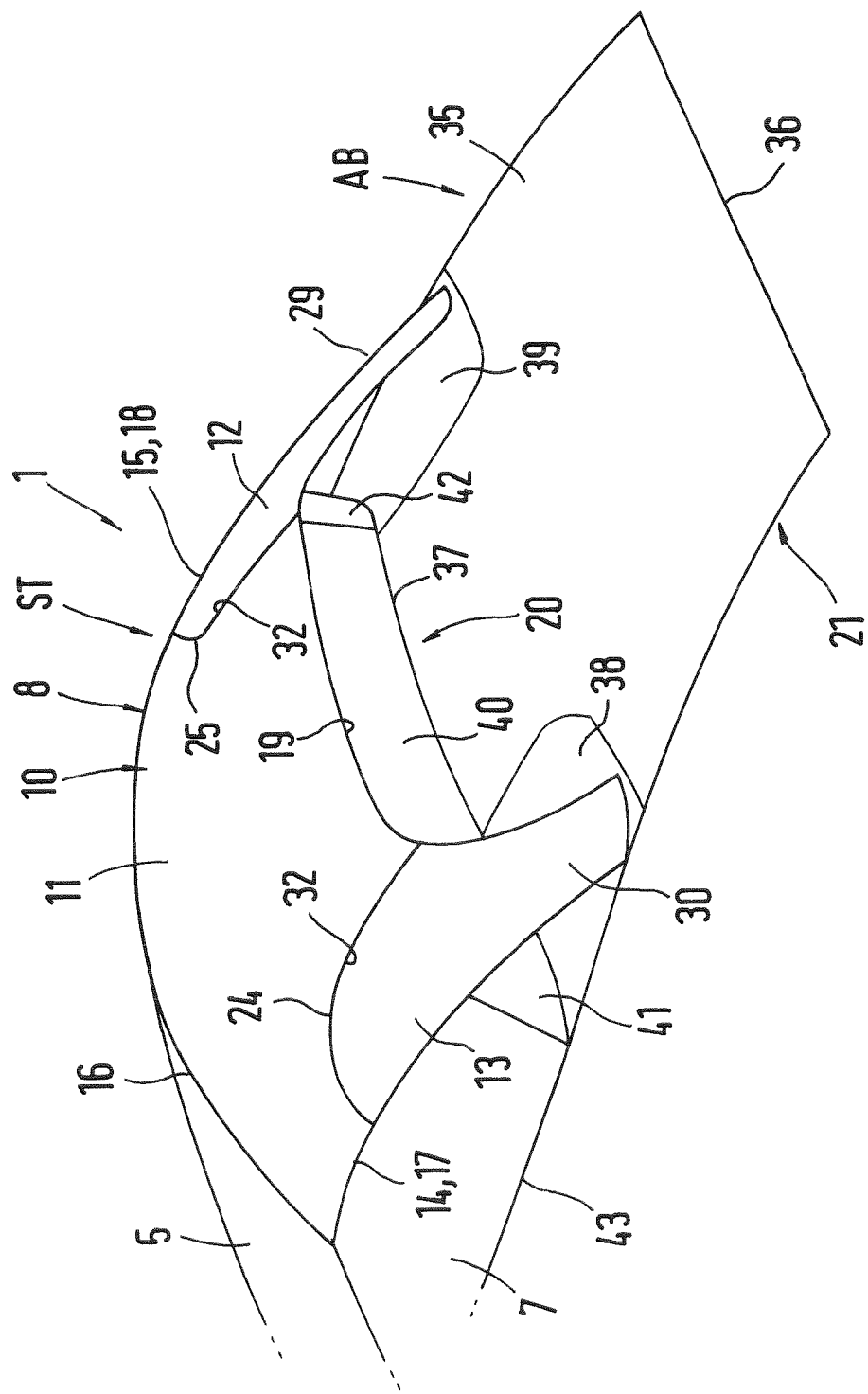

The cabriolet top 8 shown in FIG. 6 is similar to the embodiment explained above with reference to FIGS. 2 and 3. However, the boundary edges 32 of the cutouts 24 or 25 shown in FIG. 6 have arcuate or curved profiles and the closing roof parts 12 and 13 are designed correspondingly. As in FIGS. 2 and 3, the closing roof parts 12 and 13 of FIG. 6 also have the rearwardly directed extensions 29 and 30. In the shown closed position ST of the cabriolet top 8, the extensions 29 and 30 extend beyond the rear part 20 to a point over a lid 35 that closes the storage space 21 therebelow. The lid 35 is held movably on the cabriolet 1 and can assume the covering position AB shown in FIG. 6 for closing the top of the storage space 21. In an open position (not shown), the storage space 21 located below the lid 35 is opened upward. For this purpose, the lid 35 can be moved about a pivot axis that is parallel and adjacent to the rear lid edge 36. A front lid border 37 therefore is raised. The front lid border 37 is connected to the rear part 20. The closing roof parts 12 and 13 initially could be lifted from the lid 35 and raised toward the main roof part 11 to accommodate the opening movement about the pivot axis parallel to the rear lid border 36. The pivoting range of the lid 35 therefore is opened up.

In another embodiment, the lid 35 could have laterally outer covers 38 and 39 that can be decoupled from the lid 35 before movement of the lid 35. The lid 35 then could be opened about the pivot axis that runs parallel to the rear lid border 36. The covers 38 and 39 could subsequently be moved away. The cabriolet top 8 then could be moved from the shown closed position ST into the storage position AS (not shown in FIG. 6) in the storage space 21. Subsequently, the covers 38 and 39 again can take up their cover position AB (shown in FIG. 6). Then, or at the same time, the lid 35 can be brought about the rear pivoting axis and into the covering position AB. A boot (not shown) could be adjacent to the storage space under the lid 35 for accessibility thereto. In this case, the lid 35 could be opened and closed about a further pivot axis lying parallel to the front edge 37 of the lid.

The embodiment of FIG. 6 also has a rear part 20 arranged approximately upright under the rear side 19 of the main roof part 11 in the closed position ST. Furthermore, the rear part 20 extends laterally out as far as the side windows 6 and 7. In particular, the rear part 20 is adjacent in a sealing manner to the side windows 6 and 7. The rear part 20 can be of multipart or single-part design. In the FIG. 6 embodiment, the rear part 20 has a multipart form with a large central section 40 and small side sections 41 and 42 on the outside of the central section 40. The side sections 41 and 42 of the rear part 20 can have an arcuate profile in the direction of the side windows 6 and 7, as can be seen for the side section 42. In the closed position ST, the side sections 41 and 42 and the central section 40 are located above a belt line 43 of the vehicle body. The rear part 20 can be designed entirely as a rear window, i.e. the central section 40 and the side sections 41 and 42 can be of transparent design in the form of a window element. However, the side sections 41 and 42 could be opaque or merely partially transparent and the central section 40 could be a fully transparent rear window.

Figure 7:
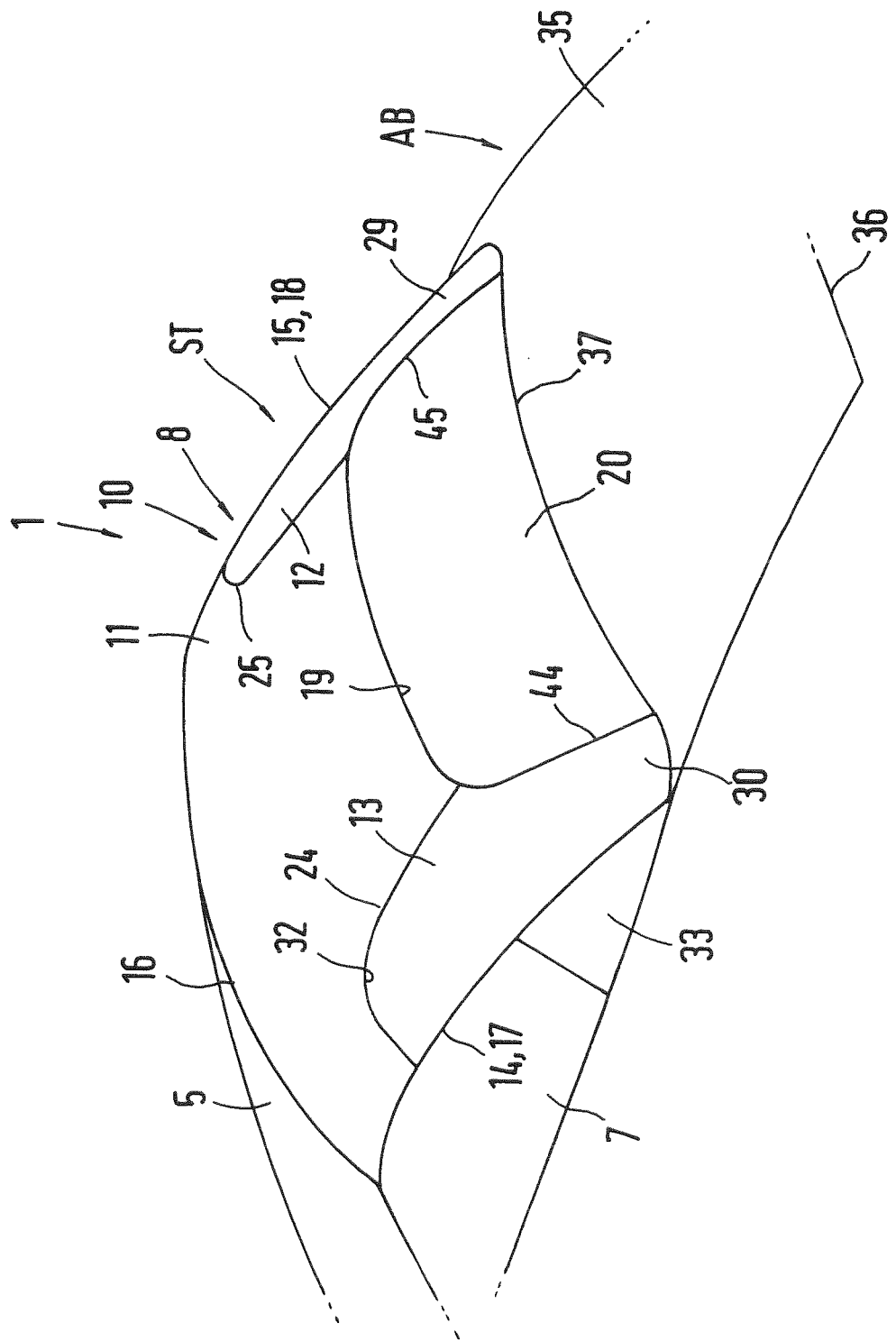

FIG. 7 shows a cabriolet 1 with a cabriolet top 8 as explained in more detail in conjunction with FIG. 2. More particularly, the cabriolet 1 has rear side windows 33 and 34 behind the side windows 6 and 7 are therefore arranged upright under the closing roof parts 12 and 13. The rear part 20 is a single part and, in the closed position ST of the cabriolet top 8, is arranged flush in a sloping position between the extensions 29 and 30 of the closing roof parts 12 and 13. The rear part 20 adjoins the rear side 19 of the main roof part 11 and the inner side borders 44 and 45 of the closing roof parts 12, 13 and of the extensions 29, 30 in a flush manner. The rear windows 33 and 34 (not illustrated in FIG. 7) can be held movably on the corresponding closing roof parts 12 and 13. As an alternative, the rear side windows 33 and 34 can be held in a lowerable and raisable manner on the body of the cabriolet 1. In the closed position ST, the rear side windows 33 and 34 are arranged upright below the closing roof parts 12, 13. The front lid border 37 is adjacent in a sealing manner to the rear part 20 and the ends of the extensions 29 and 30. The lid 35 therefore can be opened parallel to the rear edge 36 about a pivot axis when the cabriolet top 8 and the rear part 20 are to be put away.

Figure 8:
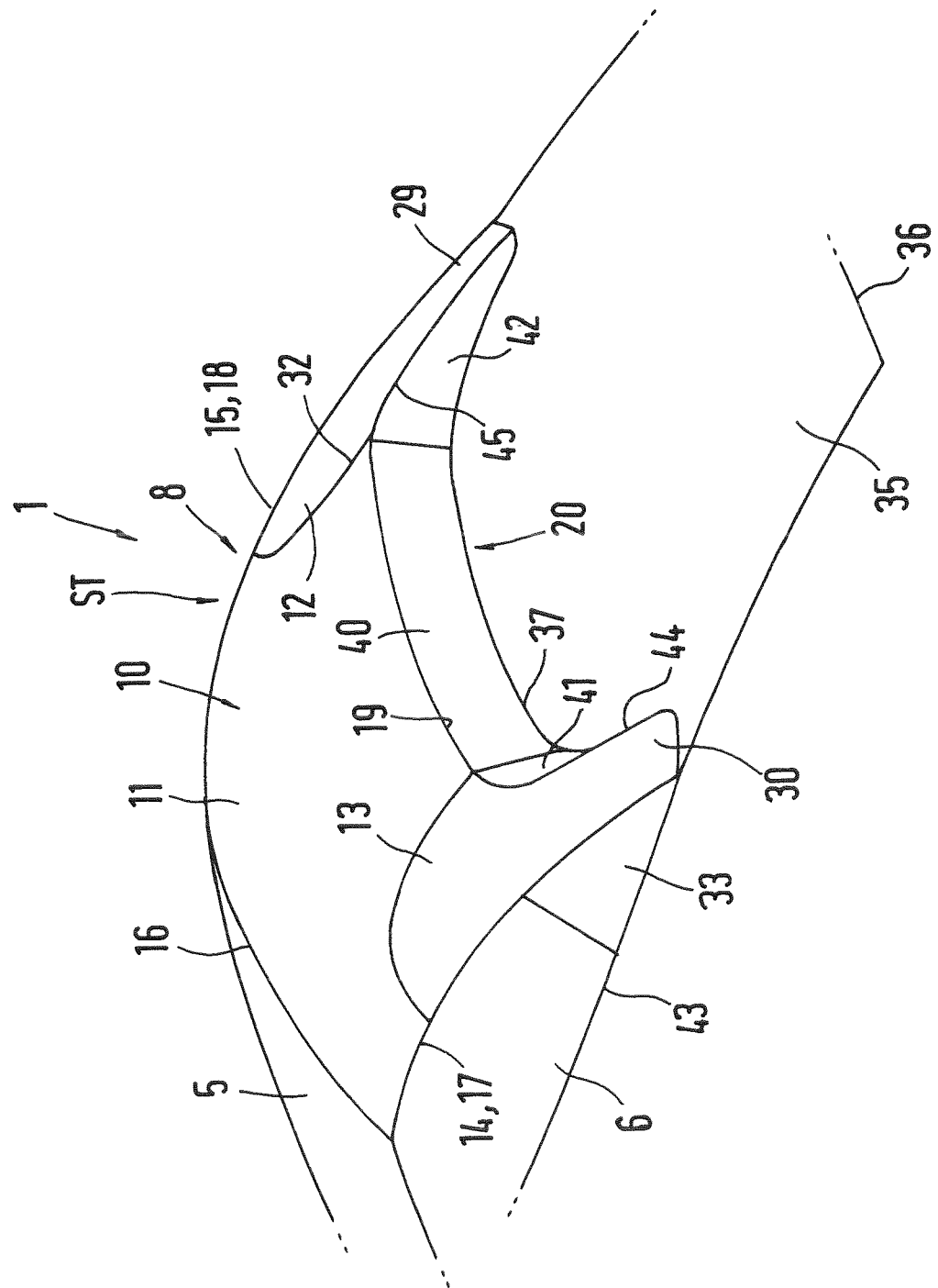

The starting point of the embodiment of FIG. 8 is the cabriolet top 8 shown in FIG. 7, including the rear side windows 33 and 34. However, the rear part 20 is not flush between the inner side borders 44 and 45 of the extensions 29 and 30. Rather, the rear part 20 stands approximately upright under the closing roof parts 12, 13 and the borders 44 and 45 and under the rear end 19 of the main roof part 11. Therefore, the upright rear part 20 follows the arcuate profile of the inner borders 44 and 45 and of the rear end 19 of the main roof part 11, as illustrated in FIG. 8. The illustrated rear part 20 has a multipart form with a central section 40 and side sections 41 and 42. The central section 40 extends between the boundary edges 32 of the cutouts 24 and 25, and the side sections 41, 42 extend from the central section 40 to the ends of the extensions 29 and 30. The central section 40 and side sections 41 and 42 each can be rear windows. However, at least one of the sections can be only partially transparent or opaque. The central section 40 and side sections 41 and 42 can be lowered together under the belt line 43 independently of the position of the cabriolet top 8. The rear part 20 illustrated in FIG. 8 can be part of the cabriolet top 8 or can be connected to the body of the cabriolet 1.

Figure 9:
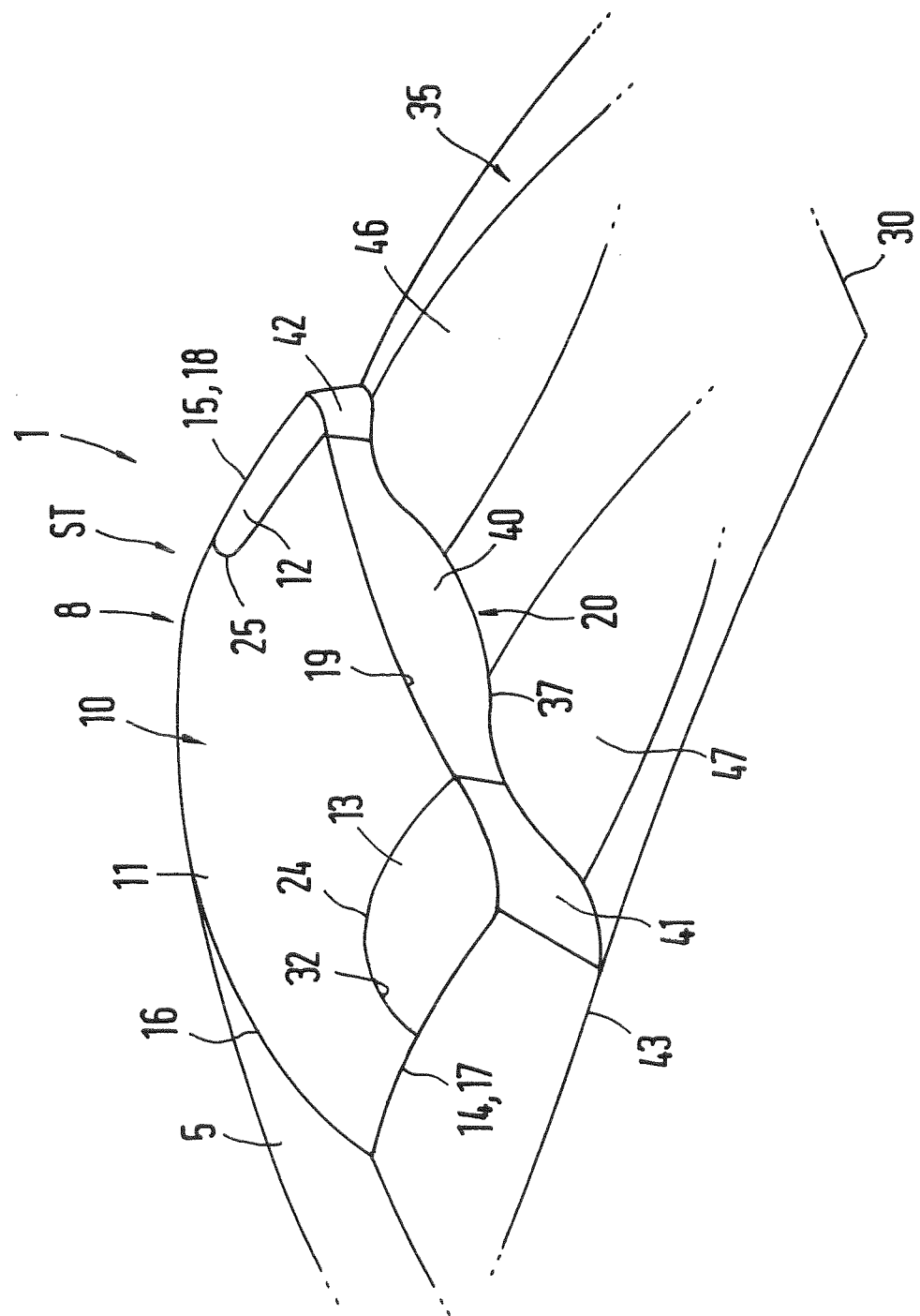

FIG. 9 shows a cabriolet top 8 essentially as described in conjunction with FIG. 1. The upright rear part 20 extends below the closing roof parts 12 and 13 and the rear end 19 of the main roof part 11. The rear part 20 can be a single part or can have a central section 40 and side sections 41 and 42, as shown in FIG. 9 and as described in conjunction with FIG. 6. The closing roof parts 12 and 13 of FIG. 9 have no extensions and end flush with the rear end 19 of the main roof part 11. The lid 35 of FIG. 9 is movable, as explained in conjunction with the previous embodiments. Accordingly, the lid 35 has a front edge 37, a rear edge 36 and a pivot axis parallel to the rear edge 36. The front edge 37 of the lid 35 is connected to the rear part 20 in a sealing manner. Two elevations 46 and 47 are formed on the upper side of the lid 35 and extend to the front edge 37 of the lid 35. The elevations 46 and 47 are arcuate in cross section to form dome-like shapes. The elevations 46 and 47 can be formed on the lid 35 laterally on the outside and in a mirror-inverted manner with respect to the vehicle center longitudinal axis FL shown in FIG. 1. A trough can be between the two elevations 46 and 47. The overall effect is therefore a wavy shape for the profile of the front edge 37 of the lid 35.

The embodiment of FIG. 10 shows rear side windows 33 and 34 arranged under extensions 29 and 30 of the closing roof parts 12 and 13. The extensions 29 and 30 have inner border 44 and 45 that taper to a point toward the vehicle rear. The rear part 20 stands upright under the rear end 19 and the inner borders 44 and 45. The rear part 20 can be of single-part design. However, the illustrated rear part 20 is of multipart design with a central section 40 and side sections 41 and 42. The side sections 41 and 42 can be in single-part or multipart form. In the illustrated embodiment, the side sections 41 and 42 each are of two-part design with an intermediate piece 48 and an end piece 49. The lid 35 corresponds to the lid 35 that is shown in FIG. 9.

The embodiment of FIG. 11 has elevations 46 and 47 with a height to extend as far as the rear end 19 of the main roof part 11. The rear part 20 is located only between the elevations 46 and 47. Additionally, the closing roof parts 12 and 13 extend over the elevations 46 and 47 and can rest in a sealing manner on the elevations 46 and 47, as shown in FIG. 12. The rear lid 35 of the FIG. 11 embodiment has covers 38 and 39 similar to FIG. 6 so that the cabriolet top 8 can be put away together with the closing roof parts 12 and 13. The covers therefore are located in the elevations 46 and 47, as illustrated in FIG. 11. However, the lid 35 also could be formed without said decouplable covers 38 and 39. It then would be necessary to move the closing roof parts 12 and 13 out of the pivoting range of the lid 35 before the lid 35 is opened, as already has been explained above.

Figure 13:
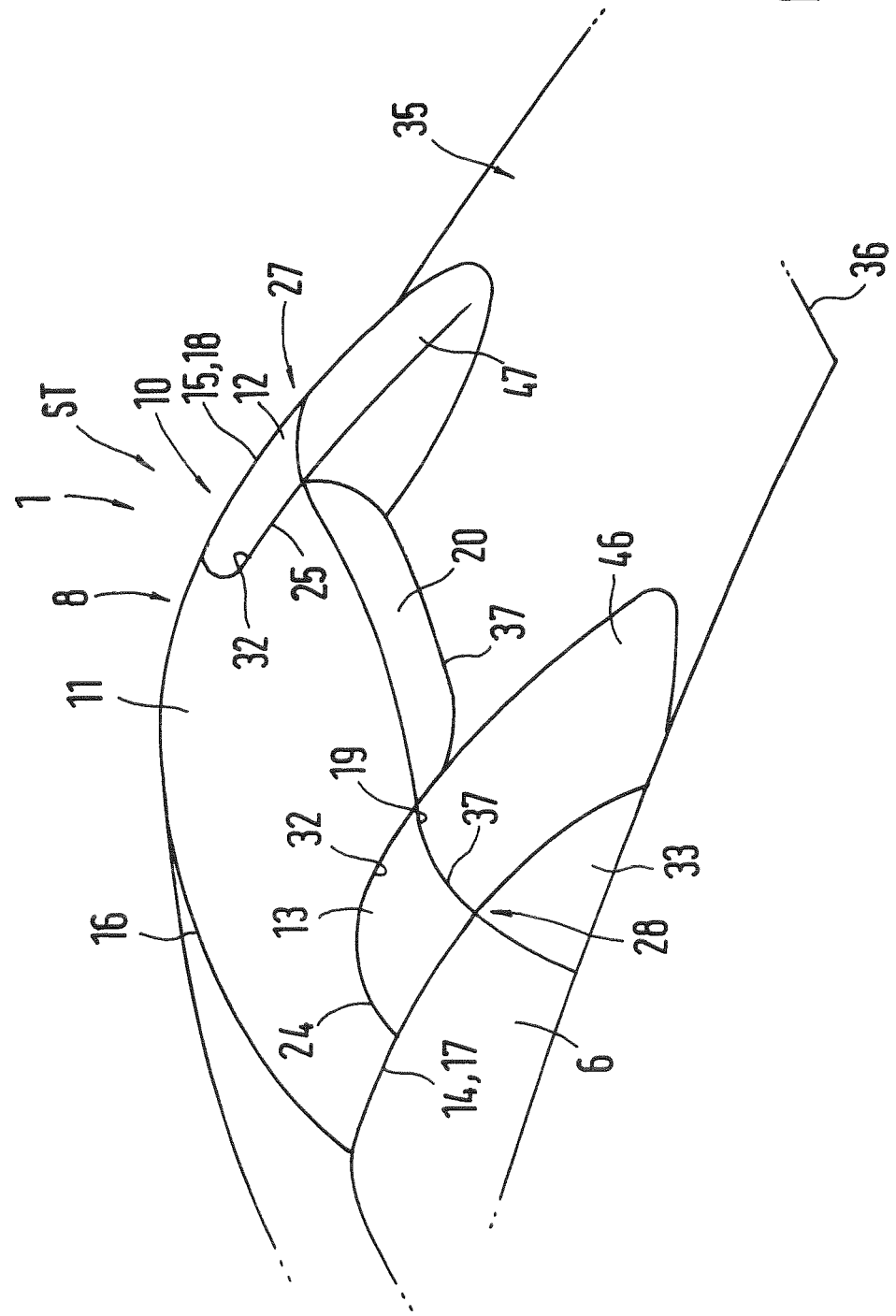
FIG. 13 shows a further exemplary embodiment of a cabriolet top.

The embodiment of FIG. 13 has closing roof parts 12 and 13 without extensions. Additionally, the elevations 46 and 47 on the lid 35 rise as far as the closing roof parts 12 and 13 and are adjacent thereto in a sealing manner when the lid 35 is in the covering position AB and the cabriolet top 8 is in the closed position ST. The rear part 20 can be a rear window and extends between the elevations. The rear side windows 33 and 34 are arranged laterally below the elevations 46 and 47. The closing roof parts 12 and 13 therefore end flush with the rear end 19 of the main roof part 11.

The following therefore applies to all of the cutouts and closing roof parts described above. If the at least one closing roof part 12, 13 is moved out of the respective cutout, the main roof part 11 has a shape deviating from a rectangle or polygon, and particularly a shape with more than four corners. The boundary edge 32 of a cutout can have a quadrangular or rectangular, rectilinear or curved profile. The closing roof part 12, 13 is correspondingly fit in the cutout. The closing roof part 12, 13 can have a larger area than the associated cutout by providing extensions as explained with reference to FIG. 2. In the closed position ST, the closing roof parts 12, 13 then end flush with the sides 16, 17, 18, 19. The cutouts are wider than a lateral roof frame 14, 15, i.e. the width BR of said cutouts is greater than the width BE of the roof frame 14 or 15. Each cutout can be located at a distance from a lateral roof frame 14 or 15 as shown with respect to the cutout 24" in FIG.

2. A cutout 24" (FIG. 4) with the same profile for the boundary edge 32 or with a different profile also can be provided on the front side 16. Each cutout and therefore each closing roof part has a smaller width BR than the entire surface region FB of the main roof part between the roof frames 14, 15. In each case, a cutout in the surface region FB can extend between the lateral roof frames. In addition, with the exception of the cutout 24", the respectively assigned closing roof part 12 or 13 has a section of the roof frame 14 or 15. Seals between the main roof part 11, the closing roof parts 12, 13 and, if appropriate, the rear part 20 are obligatory.

What is claimed is:

1. A cabriolet top for a cabriolet vehicle that has a storage space for the cabriolet top, the storage space having at least one convex projection, the cabriolet top having a roof which, in a closed position of the cabriolet top, upwardly bounds a vehicle interior and, for an open position of the cabriolet vehicle, is movable into a storage position in the storage space, the cabriolet top having an approximately rectangular shape in the closed position, the cabriolet top comprising a plurality of movable roof parts which, in the closed position, form a continuous roof surface, the movable roof parts including a nonrectangular main roof part with at least one open-edged cutout and at least one closing roof part that closes the cutout when the roof is in the closed position, the at least one closing roof part being displaced relative to the main roof part when the roof is in the storage position and opens up the cutout so that the cutout of the main roof part can nest with the convex projection in the storage space.

2. The cabriolet top of claim 1, wherein the main roof part is arranged between a rear part and a windscreen frame when the roof is in the closed position.

3. The cabriolet top of claim 2, wherein the cabriolet top comprises the rear part.

4. The cabriolet top of claim 1, wherein the cutout has a boundary edge that has an angular, rectilinear or curved profile.

5. The cabriolet top of claim 1, wherein the closing roof part has a larger surface than the cutout.

6. The cabriolet top of claim 1, wherein the closing roof part is stored in the storage position below, above, next to or behind the main roof part in the storage space.

7. The cabriolet top of claim 6, wherein the closing roof part stands upright next to the main roof part in the storage position.

8. The cabriolet top of claim 1, wherein the cutout is a corner cutout on the main roof part.

9. The cabriolet top of claim 1, wherein the closing roof part is raisable, lowerable, pivotable and/or rotatable relative to the main roof part during movement between the closed position and storage position.

10. The cabriolet top of claim 1, wherein the closing roof part is forcibly controlled in relation to the main roof part or has a separate drive.

11. The cabriolet top of claim 1, wherein the roof parts are rigid panels.

12. The cabriolet top of claim 1, wherein the cutout is formed in a rear section of the main roof part.

13. The cabriolet top of claim 1, wherein the at least one open-edged cutout in the roof part comprises plural of open-edged cutouts and the at least one closing roof part comprises plural of closing roof parts.

14. The cabriolet top of claim 11, wherein the cutouts are formed on at least one side of the main roof part.

15. The cabriolet top of claim 11, characterized in that the cutouts are formed on opposite sides of the main roof part.

16. The cabriolet top of claim 13, wherein the cutouts are formed on opposite longitudinal sides.

17. The cabriolet top of claim 1, wherein the main roof part has a lateral roof frame and the cutout is wider than the lateral roof frame of the main roof part.

18. The cabriolet top of claim 1, wherein the main roof part has a lateral roof frame and the cutout is spaced from the lateral roof frame of the main roof part.

19. The cabriolet top of claim 16, wherein the main roof part has left and right lateral roof frames and the cutout is narrower than a surface region of the main roof part that lies between the lateral roof frames.

20. The cabriolet top of claim 16, wherein the main roof part has left and right lateral roof frames and the cutout is formed in a surface region of the main roof part that extends between the lateral roof frames.

21. A cabriolet with a vehicle interior, a windscreen frame forward of the vehicle interior, a storage space rearward of the vehicle interior, a movable lid for closing the storage space, the lid having at least one elevation adjacent to a front edge of the lid and a cabriolet top movable between a closed position where the cabriolet top upwardly bounds the vehicle interior and a storage position where the cabriolet top is in the storage space, the cabriolet top having a main roof part with at least one open-edged cutout and at least one closing roof part that closes the cutout when the cabriolet top is in the closed position to form a continuous roof surface, the main roof part being arranged between a rear part and the windscreen frame when the roof is in the closed position and the elevation of the lid is engaged over by extensions of the closing roof parts when the cabriolet top is in the closed position, the closing roof part being displaced relative to the main roof part when the roof is in the storage position and opening the cutout.

22. A cabriolet with a vehicle interior, a storage space rearward of the vehicle interior and a cabriolet top movable between a closed position where the cabriolet top upwardly bounds the vehicle interior and a storage position where the cabriolet top is in the storage space, the storage space having at least one convex projection, the cabriolet top having a main roof part with at least one concave open-edged cutout and at least one closing roof part that closes the concave cutout when the cabriolet top is in the closed position to form a continuous roof surface, the closing roof part being displaced relative to the main roof part when the roof is in the storage position and opening the concave cutout so that the concave cutout nests with the convex projection in the storage space.

23. The cabriolet of claim 22, further comprising a windscreen with a windscreen frame forward of the vehicle interior, the main roof part being arranged between a rear part of the cabriolet and the windscreen frame when the roof is in the closed position, the rear part comprising a rear window.

24. The cabriolet of claim 23, wherein the rear part comprises a plurality of sections.

25. The cabriolet of claim 23, wherein the rear window comprises a plurality of sections.

26. The cabriolet of claim 23, wherein the rear part has opposite sides connected to side windows.

27. The cabriolet of claim 26, further comprising rear side windows adjoining the side window.

28. The cabriolet of claim 27 wherein the rear side windows are located under the closing roof part when the cabriolet top is in the closed position.

29. The cabriolet of claim 28, wherein the closing roof parts have extensions and the rear part is arranged between extensions.

30. The cabriolet of claim 29, characterized in that the rear part comprises a plurality of sections.

31. The cabriolet of claim 30, wherein the rear part is arranged approximately upright under the extensions and the main roof part when the cabriolet top is in the closed position.

32. The cabriolet of claim 22, further comprising a movable lid for closing the storage space.

33. The cabriolet of claim 32, wherein the lid is connected by a lid front edge to a rear part of the cabriolet.

34. A cabriolet with a vehicle interior, a windscreen frame forward of the vehicle interior, a storage space rearward of the vehicle interior, a movable lid for closing the storage space, the lid having covers that are decouplable from the lid and a cabriolet top movable between a closed position where the cabriolet top upwardly bounds the vehicle interior and a storage position where the cabriolet top is in the storage space, the cabriolet top having a main roof part with at least one open-edged cutout and at least one closing roof part that closes the cutout when the cabriolet top is in the closed position to form a continuous roof surface, the main roof part being arranged between a rear part and the windscreen frame when the roof is in the closed position, the closing roof part being displaced relative to the main roof part when the roof is in the storage position and opening the cutout.

35. The cabriolet of claim 32, wherein the lid has at least one elevation adjacent to a front edge of the lid.

36. The cabriolet of claim 35, wherein the at least one elevation is dome-shaped.

37. The cabriolet of claim 35, wherein the elevation is engaged over by extensions of the closing roof parts when the cabriolet top is in the closed position.

38. The cabriolet of claim 35, wherein the elevation is connected flush to the closing roof part.

39. The cabriolet of claim 22, wherein the roof parts are rigid panels.

40. The cabriolet of claim 22, further comprising a windscreen forward of the vehicle interior, the main roof part being arranged between a rear part of the cabriolet and the windscreen frame when the roof is in the closed position.

* * * * *